Nov. 18, 1952     A. C. BUTTS     2,618,261

PESSARY

Filed Dec. 27, 1950

INVENTOR.
ARTHUR C. BUTTS
BY Benj. T. Rauber
ATTORNEY

Patented Nov. 18, 1952

2,618,261

UNITED STATES PATENT OFFICE 2,618,261

PESSARY

Arthur C. Butts, Bronx, N. Y.

Application December 27, 1950, Serial No. 202,984

5 Claims. (Cl. 128—127)

My invention relates to improvements in pessaries for supporting certain organs of the human body.

The dimensions of the organ to be supported by a pessary and the space available vary for different patients and consequently to provide adequate support without unnecessary discomfort would require a pessary of a special size for each individual patient. Heretofore to meet this condition pessaries have been made in a limited number of sizes and that one was selected which came nearest to meeting the needs of the patient.

My present invention provides a pessary in which the dimension or area of the supporting surface may be adjusted in graduated steps to meet any condition. It also provides an adjustment of the length of the stem. In making these adjustments, the supporting surface is made substantially smooth and continuous so as to avoid any occasion for the lodgement of material and a minimum amount of tissue irritation. Suitable drainage is also provided.

In my invention I provide a base having a circular supporting disc or platform and a depending stem. The supporting area of the platform is that of the minimum size of the pessary. To increase the supporting area, the periphery of the disc is fitted with a ring or a succession of rings of increasing diameters, the smallest ring fitting tightly on the periphery of the platform or disc, and each succeeding ring fitting tightly on the next adjacent ring, with sufficient friction to be held firmly in place. The peripheral edge of the disc and the inner and outer peripheral edge of each ring may be very slightly tapered and roughened so that when mounted on the disc, or on a smaller ring and pressed firmly in place, the ring will be held with its upper surface substantially co-planar with the upper surface of the disc and adjacent ring to form a continuous, smooth, or slightly centrally corrugated upper surface, preferably slightly concave. The rings may be slightly resilient and of any suitable material, preferably of a plastic capable of being heated for sterilizing without distortion. Suitable drainage openings are provided in the disc or platform and through the stem.

To enable the length of the stem to be adjusted it is provided with a threaded or tapped or equivalent surface to receive a similarly threaded or tapped extension or series of extensions. By adding such extensions the length of the stem may be increased by successive stages.

The various features of the invention are illustrated, by way of example, in the accompanying drawings in which, Fig. 1 is a plan view of a pessary embodying a preferred form of the invention;

Figure 1:
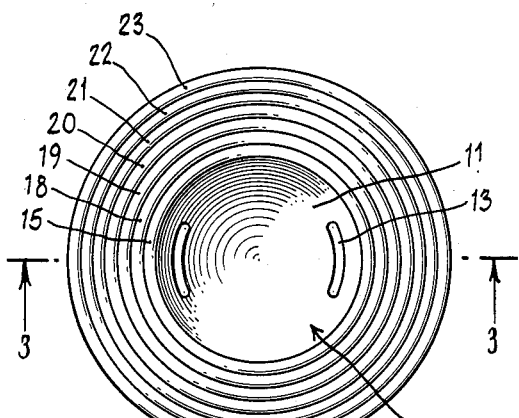
Figure 2:
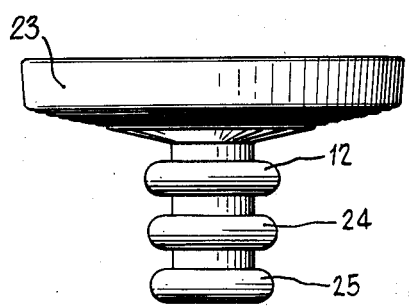
Fig. 2 is an elevation of the pessary.

Referring to the accompanying drawings, the pessary comprises a platform or base 10 having a slightly concave upper surface 11 and a depending stem 12. The disc is provided with drainage slots 13, two being shown by way of example. The peripheral edge 14 of the disc is slightly tapered to receive a ring 15, having an inner periphery 16 of the same taper and diameter as the outer periphery of the disc and an outer tapered periphery 17. Similarly a number of rings 18, 19, 20, 21, 22 and 23 are provided, each with a tapered inner periphery of a diameter to fit tightly on the next smaller ring when pressed to the position shown in Figs. 1 and 2 and 3. Accordingly the diameter of the disc or platform 10 may be built up from the minimum original diameter to any desired diameter by adding successive rings.

The rings may be made of any desired thickness, as for example about $\frac{1}{16}$ of an inch, so that the increments in diameter may be made as small as desired. The contacting peripheries of the rings may be of a matt or ground surface to provide sufficient adherence of one ring on its neighbor.

Figure 3:
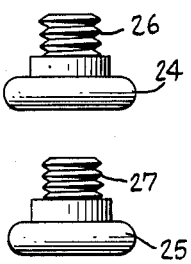
Fig. 3 is a vertical section taken on line 3—3 of Fig. 1.
Figure 3:
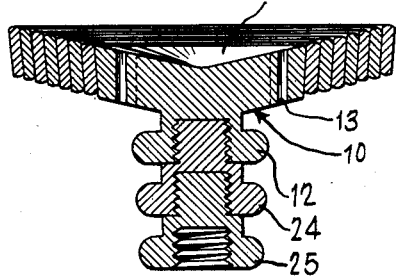

The upper surface of the built up disc is substantially smooth or with but slight concentric corrugations as indicated in Fig. 3.

Figure 4:
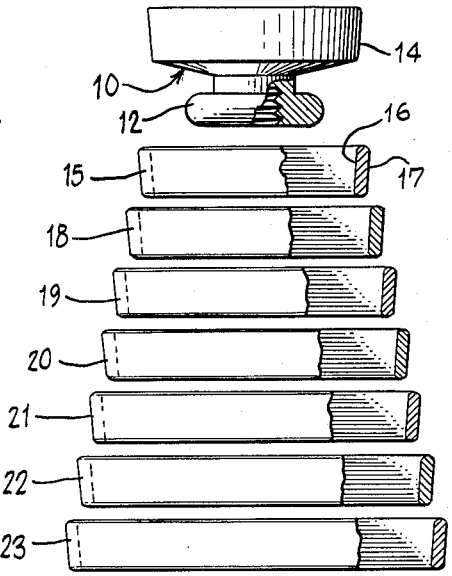
Fig. 4 is an exploded view showing the parts separated and partly in section.

The effective length of the stem 12 may be increased by securing thereto successive extension sections 24 and 25. These sections may be secured to the stem in any suitable manner and may be of any suitable shape. As shown in Figs. 3 and 4, the stem 12 may be recessed and tapped or threaded internally to receive a threaded shank 26 of the section 24 and the section 24 may be similarly recessed and tapped or threaded to receive a threaded shank 27 of the section 25.

The pessary may be made of any suitable material as, for example, a rigid synthetic plastic, preferably one that is undistorted or unaffected by boiling water for sterilization. The rings and sections may be removed for cleaning and sterilization.

Through the above invention I have provided a pessary, the dimensions of which may be adjusted to meet any conditions, and in which this adjustment may be easily made. This adjustment in size is made without affecting the general shape of the pessary or its smoothness of contour.

Having described my invention, what I claim is:

1. A pessary comprising a disc having a depending stem and a circular periphery and a series of concentric separable rings, the periphery of the smallest ring fitting tightly the periphery of said disc and the inner periphery of each successive ring fitting tightly the outer periphery of the next smaller ring.

2. The pessary of claim 1 in which the upper surface of said pessary is concave.

3. The pessary of claim 1 in which the periphery of said disc and the inner and outer peripheries of said rings are tapered and roughened.

4. The pessary of claim 1 having drainage passages through said disc.

5. The pessary of claim 1 having removable extensions on said stem.

ARTHUR C. BUTTS.

REFERENCES CITED

The following references are of record in the file of this patent:

UNITED STATES PATENTS

| Number | Name | Date |
|---|---|---|
| 1,019,373 | Shaulis | Mar. 5, 1912 |
| 1,219,496 | Shaulis | Mar. 20, 1917 |
| 2,295,062 | Townsend | Sept. 8, 1942 |

FOREIGN PATENTS

| Number | Country | Date |
|---|---|---|
| 587,231 | Germany | Nov. 1, 1933 |